(12) United States Patent
Brandt et al.

(10) Patent No.: US 9,166,893 B2
(45) Date of Patent: Oct. 20, 2015

(54) METHODS, APPARATUS AND SYSTEMS FOR MONITORING LOCATIONS OF DATA WITHIN A NETWORK SERVICE

(75) Inventors: Marc Brandt, Eybens na (FR); Siani Pearson, Bristol (GB); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 145 days.

(21) Appl. No.: 13/818,850

(22) PCT Filed: Sep. 23, 2010

(86) PCT No.: PCT/US2010/049947
§ 371 (c)(1),
(2), (4) Date: Feb. 25, 2013

(87) PCT Pub. No.: WO2012/039714
PCT Pub. Date: Mar. 29, 2012

(65) Prior Publication Data
US 2013/0159723 A1  Jun. 20, 2013

(51) Int. Cl.
*H04L 9/32* (2006.01)
*H04L 12/26* (2006.01)
*G06F 21/62* (2013.01)
*H04L 9/28* (2006.01)

(52) U.S. Cl.
CPC ............ *H04L 43/08* (2013.01); *G06F 21/6218* (2013.01); *H04L 9/28* (2013.01); *G06F 2221/2101* (2013.01); *G06F 2221/2111* (2013.01)

(58) Field of Classification Search
CPC ....... H04L 43/08; H04L 9/28; G06F 21/6218; G06F 2221/2111; G06F 2221/2101
USPC .......................................................... 713/176
See application file for complete search history.

(56) References Cited

U.S. PATENT DOCUMENTS

| | | | |
|---|---|---|---|
| 8,590,024 B2 * | 11/2013 | Sims et al. ........................ 726/7 |
| 2002/0032787 A1 * | 3/2002 | Overton et al. ................ 709/230 |
| 2002/0087860 A1 * | 7/2002 | William Kravitz ........... 713/168 |
| 2006/0107008 A1 * | 5/2006 | Ghanem et al. ............... 711/163 |
| 2006/0117175 A1 * | 6/2006 | Miura et al. ................... 713/155 |
| 2008/0222711 A1 * | 9/2008 | Michaelis ......................... 726/7 |
| 2010/0011210 A1 * | 1/2010 | Scarlata ......................... 713/167 |
| 2010/0184509 A1 * | 7/2010 | Sylla et al. ...................... 463/29 |
| 2014/0089353 A1 * | 3/2014 | Koyama et al. ............... 707/803 |

OTHER PUBLICATIONS

International Preliminary Report on Patentability, Apr. 4, 2013. PCT Application No. PCT/US2010/049947.
(Continued)

*Primary Examiner* — Nirav B Patel
*Assistant Examiner* — Mohammed Waliullah
(74) *Attorney, Agent, or Firm* — Hewlett-Packard Patent Department

(57) ABSTRACT

In one embodiment, a data set is received at a network service element of a network service, a location record for that data set is generated, and the location record is sent to a location registry within the network service to monitored locations of that data set within a network service. The network service element is operatively coupled to a communications link. The location record is generated based on a portion of the data set and a cryptographic key associated with the network service element. The location record uniquely identifies the presence of the data set at the network service element.

14 Claims, 11 Drawing Sheets

(56) References Cited

OTHER PUBLICATIONS

International Search Report and Written Opinion, Report dated Jun. 3, 2011, Hewlett-Packard Development Company, L.P., PCT Application No. PCT/US2010/049947, Filed Sep. 23, 2010.

Lin, Dan et al. "Data Protection Models for Service Provisioning in the Cloud." In Proceedings of the 15th ACM Symposium on Access Control Models and Technologies, pp. 183-192. ACM, 2010.

Popa, Raluca Ada et al. "Enabling security in cloud storage SLAs with CloudProof." Microsoft TechReport MSR-TR-2010 46 (2010). pp. 1-12.

Stewart, Graeme A., et al. "Storage and data management in EGEE." In Proceedings of the Fifth Australasian Symposium on ACSW Frontiers. vol. 68, pp. 69-77. Australian Computer Society, Inc., 2007.

Wang, Cong et al. "Privacy-Preserving Public Auditing for Data Storage Security in Cloud Computing." In INFOCOM, 2010 Proceedings IEEE, pp. 1-9. IEEE, 2010.

Wang, Qian et al. "Enabling public Verifiability and Data Dynamics for Storage Security in Cloud Computing." Computer Security—ESORICS 2009. pp. 355-370.

* cited by examiner

METHODS, APPARATUS AND SYSTEMS FOR MONITORING LOCATIONS OF DATA WITHIN A NETWORK SERVICE

CROSS-REFERENCE TO RELATED APPLICATION

This application is a U.S. National Stage Application of and claims priority to International Patent Application No. PCT/US2010/049947, filed on Sep. 23, 2010, and entitled "METHODS, APPARATUS AND SYSTEMS FOR MONITORING LOCATIONS OF DATA WITHIN A NETWORK SERVICE."

BACKGROUND

On-demand, elastic, and/or dynamic network services can provide flexible data processing and/or data storage. Such services allow users to access computing and/or storage resources as needed and/or to pay only for the computing and/or storage resources accessed. Additionally, such services are often distributed and hosted at physical computing resources (e.g., computer servers) in multiple geographic locations. Furthermore, implementation details of such services are typically opaque to the user.

Typically, the user does not, therefore, know or control at which physical computing resources within the service the user's data is stored and/or processed. Rather, the service typically determines at which physical computing resources the data should be processed and/or stored based on, for example, a present load or usage of the system, scheduled maintenance of physical computing resources hosting the service, detected error or failure conditions within the service, and/or other factors. As a consequence, the user of such a system is typically unable to determine at which geographic location the user's data is stored or restrict the user's data to or from one or more geographic locations.

DETAILED DESCRIPTION

Figure 1:
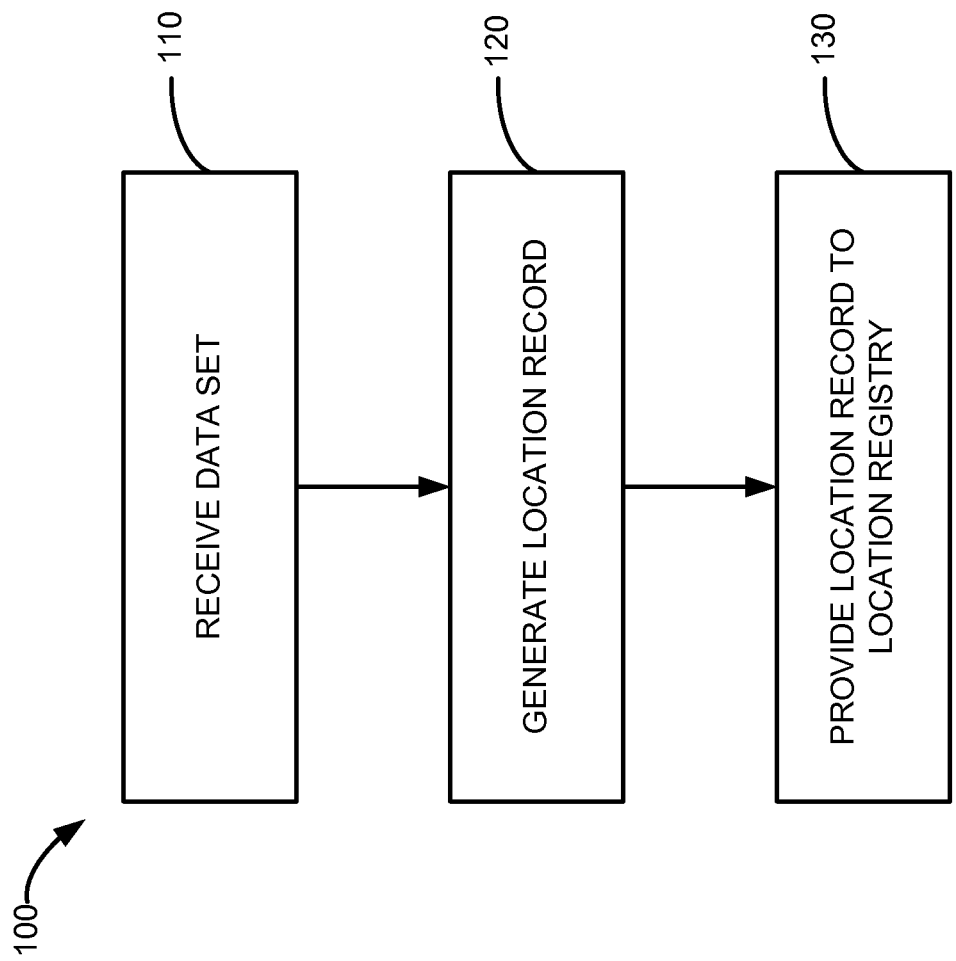
FIG. 1 is a flowchart of a process to store information related to storage of a data set, according to an embodiment.

Data can be sent via a communications link to a computing device (e.g., a computer server in a data center) that is remote from the owner or custodian of that data for storage and/or processing and accessed by the owner or custodian via the communications link. Thus, data storage and data processing can be provided as network services via communications links. Some network services can be distributed across multiple computer servers and/or data centers. Such a distributed network service can be, for example, a service or an application such as a data storage service or a data processing service that is hosted at multiple computer servers and are accessible logically via a communications link, such as a computer network, as a single network service. Such network services can be referred to a cloud services.

For example, a business located in one city sends data to a network service via the Internet for storage. The network service is hosted on one or more computer servers in a data center in a different city, state, or country. The computer servers hosting the network service can each be referred to as a network service element. Alternatively, the network service can be a distributed network service that is hosted at multiple network service elements at multiple data centers, each in a different city, state, or country. Thus, the data can be stored at one or more different physical locations (i.e., at multiple network service elements at one or more of the data centers). Additionally, the implementation of the network service is typically opaque to the business such that the business does not control and/or is not aware of the precise physical or geographic location (e.g., at which computer server in which data center) of the data. Rather, the data can be stored and accessed by the business logically. That is, the business can store and access the data via a logical identifier such as a uniform resource identifier ("URI") that is relative to the network service, rather than to the physical location of the data. Thus, because the business accesses the data logically relative to the network service rather than physically relative to the physical location of the data, the data can be stored redundantly at multiple locations (i.e., data centers or computer servers within a single data center) and/or can be moved (or migrated) among various locations (i.e., data centers or computer servers within a single data center) within the network service without affecting the business's ability to store or access the data.

The ability of the network services to store data redundantly at multiple network service elements and to migrate data among the network service elements can be beneficial to avoid data loss and simplify replacement and/or repair of network service elements. For example, the network service can migrate data from a first network service element to a second network element to allow maintenance of the first network service element. Additionally, the network service can migrate the data from one network service element to another network service element in response to load on (or use of) the network service. Furthermore, redundant storage of the data can prevent data loss due to, for example, physical destruction of a network service element at which the data is hosted.

However, the data redundancy and/or data migration properties of network services complicate tracking and auditing the physical location of data within the network service. For example, the user of the network service (e.g., the business in the example above) is not typically able to determine the physical location (i.e., the physical location of the network service element at which the data is hosted). Thus, the user cannot independently track storage or movement of data within the network service. Furthermore, although some security measures (e.g., a secure or encrypted communications link and/or credentials such as a username and password) are used to store or access data within a network service, such network services do not securely record and/or store location information related to the past and present physical locations of data. Thus, a user is unable to determine the current location of data within the network service or audit prior locations of the data within the network service.

Although the physical (or geographic) location at which data is processed and/or stored is unimportant to some users of such network systems, certain data sets are constrained by legal, regulatory, contractual, and/or other limitations to or from certain physical locations and compliance with such limitations can be required (e.g., by legal and/or contractual obligations) to be auditable (e.g., traceable). Thus, network systems that do not impose limitations on the migration of data and do not include audit (e.g., tracking) capabilities are not useful for data sets with such limitations.

Embodiments discussed herein can register (or record) the location of data within a distributed network service. Furthermore, embodiments discussed herein can provide to a client (or user) of a distributed network service the current location of data within the distributed network service and a register (e.g., a log such as a history log or an audit log) including identifiers of a group of prior locations of that data within the distributed network service. The term network service will be used herein to refer generically to any network service including a distributed network service.

In one embodiment, a network service provides on-demand data storage. In other words, a client or user of the network service can send data to the network service and the network service stores the data at data stores accessible to the network service elements of the network service without a predetermined limitation on the amount of data the client can store at the network service. The network service stores the data within the network service redundantly at multiple network service elements (i.e., at data stores accessible to the multiple network service elements). Furthermore, the network service autonomously (e.g., independent of direct control by an administrator of the network service) migrates data among the network service elements to load balance the network service and in response to detected error or potential failure conditions within the network service. For example, the network service can include a controller that monitors the load and error conditions of network service elements within the network service and sends data migration commands to the network service elements.

Additionally, the network service includes a registration module to store information about the network service elements of the network service. The registration module can be a directory or central repository of information about network service elements within the network service. Each network service element can register with the registration module and provide information related to the operating state of the network service element. For example, a network service element can provide registration information such as a digital certificate (e.g., a file including a public key and an identifier of the network service element that is signed or encrypted by some authority) or some other credential to the registration module to authenticate the identity of the network service element and announce that the network service element is operational and available within the network service. A network service element that is registered with the registration module can be referred to as a registered network service element.

The network service element can also provide information related to an operational state (or state information) of the network service element, such as a digest (e.g., a cryptographic hash value) of a software module that is hosted at the network service element, to the registration module. Such information allows the registration module, or another computing device, to determine whether the network service element is in an expected operational state. For example, the registration module can verify that the network service element is executing a particular version of a software module by comparing the digest to a previously determined (e.g., computed from the expected version of the software module) digest.

Together, the registration information and the state information of the network service element can define a trusted relationship within the network service. That is, the registration module can assume that a network service element can be trusted (i.e., will function as expected and/or is the network service element it purports to be) if the network service element provides registration information authenticating the identity of the network service element and/or state information verifying that a particular software module is hosted at the network service element. Such a network service element can be referred to as a trusted network service element.

In addition to the registration information and state information, the registration module can include information related to the locations of the network service elements of the network service. For example, a network service element can send information related to the location (or location information) such as the city, the state, and/or the country of the physical location of the network service element. The registration module can store the location information together with an identifier of the network service element to determine a location of the network service element. Furthermore, a client of the network service can specify that data received by the network service from that client can be stored only in specified locations or that such data cannot be stored in particular locations. Such limitations can be referred to as location permissions. Prior to sending the data set to a network storage element, the network service can determine whether the data set can be stored at that network storage element based on location permissions and location information stored at the registration module.

When the client of the network service transmits a data set (e.g., a file) via a communications link to the network service for storage, the network service forwards the data set to one or more network service elements for storage. Each network service element that receives the data set generates a location record to account for (or memorialize or log) the presence (or storage) of that data set at that network service element. For example, a location record can include a digest of the data set encrypted with a private key of the network service that is generated at the network service element. Additionally, the location record can include a date value, a time value, an identifier of the network service element, an identifier of the data set (e.g., an identifier uniquely identifying the data set), and/or some other information related to the storage of the data set at that network service element. Moreover, one or more of such additional values or information can also be encrypted by the private key of the network service element.

The network service element then sends the location record to a location registry of the network service. The location registry can be a repository for location records generated by network service elements within the network service. Thus, location records accounting for the presence of data sets at network service elements can be maintained.

In addition to sending the location record to the location registry, the network service element sends the location record to the client. The client receives the location record and stores the location record as a receipt of storage of the data set at a network service element within the network service. Moreover, the client can request a digital certificate including a public key of the network service element from the network service element or the registration module. As discussed above, the digital certificate can be used to authenticate the identity of the network service element, and the public key can be used to decrypt the portions of the location record encrypted using the private key of the network service element. Thus, the client can confirm (e.g., verify or validate) the identity of the network service element and can access the encrypted information stored at the location record.

As discussed above, the network service can migrate the data among the network service elements subject to location permissions for that data set stored at the registration module. Each time the data is migrated from a source network service element to a destination network service element a location record is generated for the destination network service element and sent to the location registry, as discussed above. The location record can also be sent to the client. Thus, the location registry includes location records for each network storage element at which a data set has been stored. In other words, the location registry can track the movement and storage of a data set within the network service. Furthermore, each location record can be validates as generated by a particular network service element because the location record is encrypted using a private key of the network service element that is associated with a digital certificate stored at the registration module. Moreover, the network service can trust that the location record was generated by a properly operating network service element (e.g., have high degree of confidence that the network service element is not hosting malware) based on the state information stored at the registration module for the network service element.

The client can request location records from the location registry to verify or audit the storage of the data set within the network service. For example, the client can request a location register (e.g., a history or audit log) including the location records generated by the network service elements at which the data set was stored within the network service. In response to such a request, the location registry aggregates a group of the location records related to a data set that are stored within the location registry into a location register (e.g., a history or audit log) and sends the location register to the client. Thus, the client can audit the locations at which the data set has been stored within the network service. Furthermore, the client can limit movement of the data set within the network service because the network service limits migration of the data set by location permissions and location information of network service elements within the registration module.

As used in this specification, the singular forms "a," "an" and "the" include plural referents unless the context clearly dictates otherwise. Thus, for example, the term "network service element" is intended to mean one or more network service elements or a combination of network service elements. Additionally, as used herein, the term "module" refers to circuitry and/or software, firmware, programming, machine- or processor readable instructions, commands, or code that are stored at a memory and executed or interpreted at a processor.

FIG. 1 is a flowchart of a process to store information related to storage of a data set, according to an embodiment. Process 100 can be implemented as a hardware module and/or a software module. For example, process 100 can be implemented as application-specific circuitry or as a software module including instructions stored at a memory and executed at a processor in communication with the memory. A data set is received at block 110. A data set can be any group of data such as a file, a directory, a data stream, a data block, and/or any quantum of data. For example, a data set can be a data packet received via a packet switching communications link.

Figure 2:
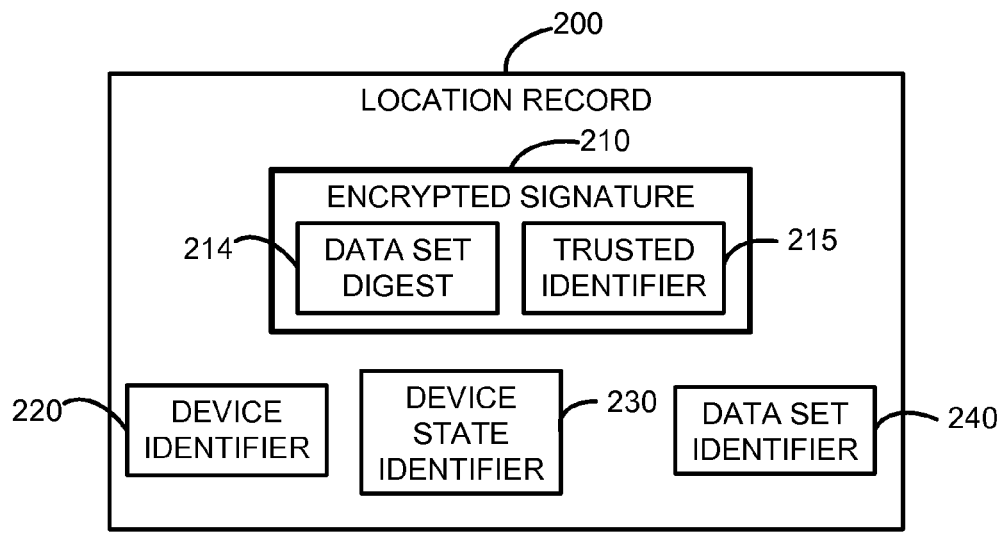
FIG. 2 is an illustration of a location record, according to an embodiment.

The data set received at block 110 is then used to generate a location record at block 120. A location record is information related to the presence or storage of a data set at a network service element. Said differently, the location record accounts for the presence of the data set at a computing device such as a network service element. FIG. 2 is an illustration of a location record, according to an embodiment. As illustrated in FIG. 2, location record 200 includes multiple data fields and/or data values. Location record includes encrypted signature 210, device identifier 220, device state identifier 230, and data set identifier 240. Encrypted signature 210 includes data set digest 213 and trusted identifier 215. Data set digest 214 is a value related to or identifying a data set. For example, data set digest 214 can be a cryptographic hash value generated from a data set received at a network storage element. Trusted identifier 215 is an identifier of a trusted network service element within a network service. In other words, trusted identifier 215 can identify a network service element within a network service. Data set digest 214 and trusted identifier 215 are encrypted using, for example, a public key of a network service element to generate encrypted signature 210. In some embodiments, data set digest 214 and trusted identifier 215 are encrypted using a symmetric cryptographic key to generate encrypted signature 210. Alternatively, data set digest 214 and trusted identifier 215 can be included in location record 200 unencrypted.

Location record 200 also includes device identifier 220. Device identifier 220 is an identifier of a device that generated location record 200. For example, device identifier 220 can be identical to trusted identifier 215, but unencrypted. Device identifier 220 can also be another identifier such as a hardware identifier (e.g., a medium access control ("MAC") address) of a network service element. Device identifier 220 can be useful in identifying a cryptographic key and/or cryptographic algorithm to decrypt encrypted signature 210.

Device state identifier 230 includes information related to an operating state of a network service element that generated location record 200. In other words, device state identifier 230 can be state information. That is, device state identifier 230 can be a digest (e.g., a cryptographic hash value) of a software module that is hosted at the network service element. For example, device state identifier 230 can be a digest of an operating system or virtual machine hosted at the network service element. Thus, location record 200 can include, in device state identifier 230, an attestation of the operating state of the network service element that generated location record 200 when the data set from which data set digest 214 was generated was stored at that network service element.

Data set identifier 240 is a value that identifies the data set from which data set digest 214 was generated. For example, data set identifier 240 can include an identifier such as a digest or cryptographic hash value uniquely identifying the data set. Data set identifier 240 can also include an identifier such as a URI of the data set such as a URI derived from a client identifier of the client sending the data set to a network service and a client-specified name of the data set. In some embodiments, data set identifier 240 can be identical to data set digest 214, but unencrypted. Thus, the data set to which location record 200 is related can be determined without decrypting encrypted signature 210.

In some embodiments, location record 200 can include more or fewer fields or data values than illustrated in FIG. 2. For example, one or more of device identifier 220, device state identifier 230, and data set identifier 240 can be excluded from location record 200. As a specific example, device state identifier 230, and data set identifier 240 can be excluded from location record 200 and encrypted signature 210 can be decrypted to determine to which data set location record 200 is related. Similarly, trusted identifier 215 can be excluded from encrypted signature 210. For example, device identifier 220 can be included in location record 200 and trusted identifier can be excluded from encrypted signature 210.

Referring to FIG. 1, a location record is generated at block 120 by applying a digest function such as a cryptographic hash function to the data set received at block 110 to generate a data set digest. The data set digest is then combined with an identifier of the network service element that received the data set at block 110 to generate the location record. For example, the data set digest and an identifier of the network service element that received the data set at block 110 can be encrypted to generate an encrypted signature related to the storage of the data set at the network service element. In other words, the encrypted signature is an attestation that the data set having the data set digest was stored at the network service element having the identifier included in the encrypted signature. In some embodiments, additional fields or values such as a device identifier, a device state identifier, a data set identifier, location information related to a physical location of a network service element generating the location record, and/or other fields or values related to the data set or the network service element at which the data set is stored can be included in the location record.

Figure 3:
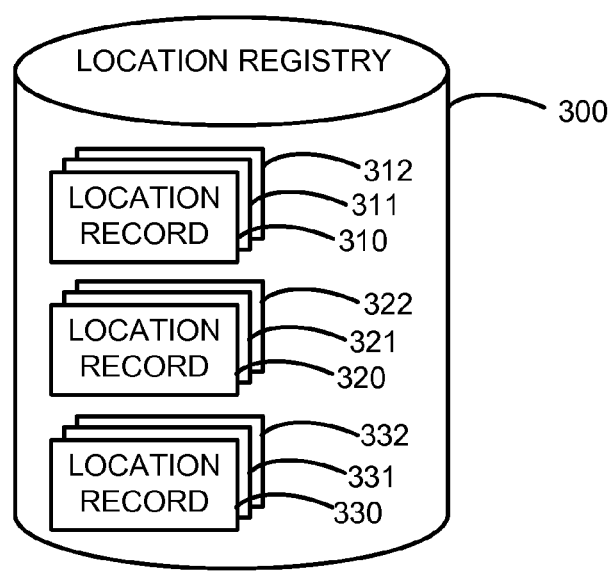
FIG. 3 is an illustration of a location registry including groups of location records, according to an embodiment.

After the location record is generated at block 120, the location record is provided (e.g., transmitted via a communications link) to a location registry at block 130. A location registry is a database or other data store or storage service used to store location records within a network service. FIG. 3 is an illustration of a location registry including groups of location records, according to an embodiment. Location registry 300 includes three groups of location records. Location records 310, 311, and 312 are location records related to a first data set. Location records 320, 321, and 322 are location records related to a second data set. Location records 330, 331, and 332 are location records related to a third data set. Location records 310, 311, 312, 320, 321, 322, 330, 331, and 332 can be stored as files, as entries in a relational database, within of one or more element of one or more extensible markup language ("XML"), or as some other collection within location registry 300.

For example, location records 310, 311, and 312 can be stored as files in a one directory of location registry 300; location records 320, 321, and 322 can be stored as files in a different directory of location registry 300; and location records 330, 331, and 332 can be stored as files in yet another directory of location registry 300. As another example, location records 310, 311, and 312 can be stored as sub-elements of an element in an XML file of location registry 300; location records 320, 321, and 322 can be stored as sub-elements of a different element in the XML file, and location records 330, 331, and 332 can be stored as sub-elements of yet another element in the XML file. In some embodiments, location records 310, 311, 312, 320, 321, 322, 330, 331, and 332 can be stored within a single table of a database without grouping any of location records 310, 311, 312, 320, 321, 322, 330, 331, and 332 based on the data set to which each of location records 310, 311, 312, 320, 321, 322, 330, 331, and 332 relates. In other words, location records 310, 311, 312, 320, 321, 322, 330, 331, and 332 can be stored individually without respect to groupings of location records 310, 311, 312, 320, 321, 322, 330, 331, and 332.

In some embodiments, a location registry can store or track the current location of data sets within a network service. The location registry can therefore be accessed to determine a present location of a data set (i.e., to determine at which network service element the data set is presently stored) within the network service. For example, a group of location records related to storage of a data set can be arranged such that the location record representing the present storage of the data set (i.e., storage of the data set at the network service element at which the data set is presently stored) can be is first in the group. In other words, the group of location records can be stored as a stack. Alternatively, the group of location records can be stored as a queue. In some embodiments, a location registry can include a table or database that stores the present location of data sets within a network service. For example, the location registry can include a table of location records including the most recently received location records for data sets within the network service.

Referring to FIG. 1, process 100 can include blocks in addition to those illustrated in FIG. 1. Additionally, one or more blocks can be rearranged. For example, process 100 can include a block (not shown) in which the location record generated at block 120 is sent to a client device. Furthermore, a location record can be sent to a client device before sending the location record to the location registry at block 130.

Figure 4:
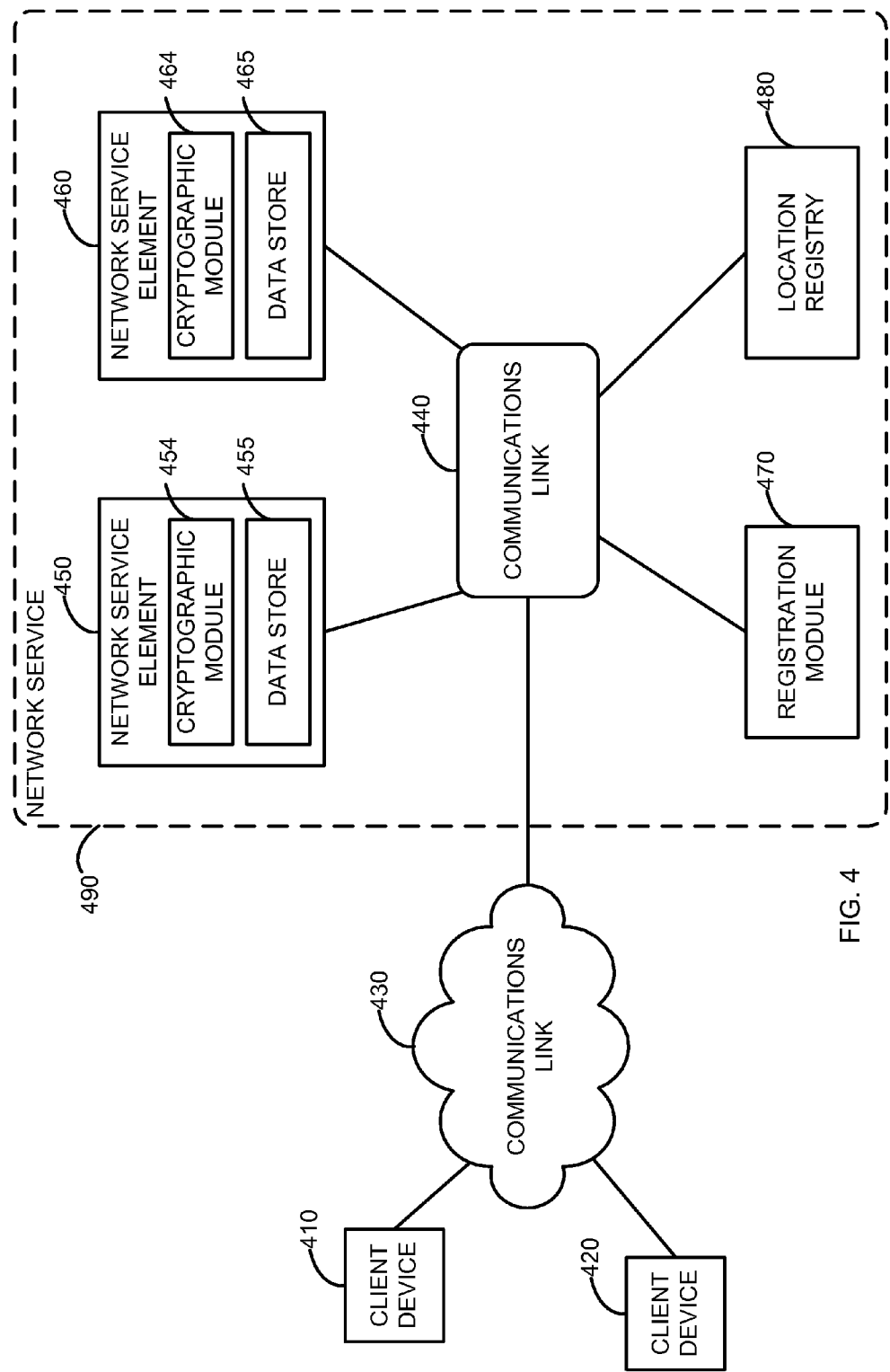
FIG. 4 is a schematic block diagram of a system including a network service, according to an embodiment.
Figure 5:
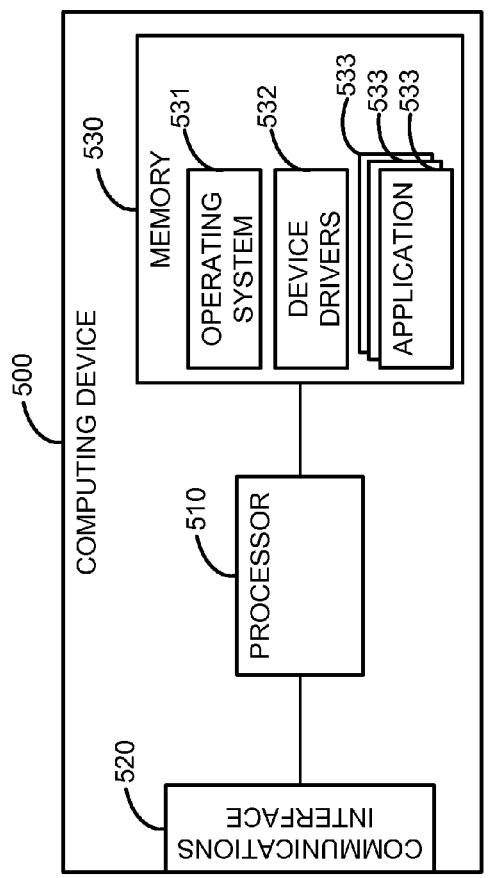
FIG. 5 is a schematic block diagram of a computing device, according to an embodiment.

FIG. 4 is a schematic block diagram of a system including a network service, according to an embodiment. The system illustrated in FIG. 4 includes client device 410, client device 420, communications link 430, and network service 490. Client devices 410 and 420 are each a computing device such as, for example, an enterprise server or storage device, a personal computer, a portable computer, a mobile device such as a personal digital assistant ("PDA") or a smartphone, or some other computing device. FIG. 5 illustrates a schematic block diagram of a computing device, according to an embodiment. As illustrated in FIG. 5, computing device 500 includes communications interface 520, processor 510, and memory 530. Processor 510 is operatively coupled to communications interface 520 and memory 530. Typically, as illustrated in FIG. 5, memory 530 includes instructions or codes (e.g., computer codes or object codes) defining software modules that are executed by processor 510 during operation of computing device 510. For example, memory 530 includes instructions that define operating system 531, device drivers 532, and applications 533 (e.g., software application programs). In other words, operating system 531, device drivers 532, applications 533, and other software modules stored as instructions (not shown) at memory 530 and executed at processor 510 are hosted at computing device 500. In some embodiments, data sets such as data sets received via communications interface 520 can be stored at memory 530.

Communications interface 520 is an interface accessible to processor 510 to communicate with (i.e., transmit symbols representing data to and receive such symbols from) other processors and/or computing devices via a communications link. In other words, communications interface 520 can receive data from processor 510 and transmit symbols representing that data via a communications interface. Moreover, communications interface 520 can receive symbols from other communications interfaces via a communications interface and send data represented by those symbols to processor 510. For example, communications interface 520 can be a telephone network interface, a twisted-pair network interface, a coaxial network interface, a fiber-optic network interface, a wireless network interface such as a wireless local area network ("WLAN") or a cellular network, and/or some other network or communications interface.

Referring to FIG. 4, client devices 410 and 420 access network service 490 via communications link 430. Communications link 430 can include any connector and/or system that allow clients 410 and 420 to communicate with network service 490. For example, communications link 430 can be one or more of a cable (e.g., telecommunication cable, twisted-pair cable, coaxial cable, or fiber-optic cable), wireless link or connection (e.g., radio-frequency link, wireless optical link, or infrared link), or any other connector or system that supports transmission of communications symbols. Additionally, communications link 430 can include a communications network or combination of communications networks capable of transmitting information (e.g., symbols or signals representing data) such as, for example, an Ethernet network, a fiber-optic network, a wireless network, an intranet, and/or the Internet.

In some embodiments, communications link 430 can include multiple communications links and/or communications networks operatively coupled one to another by, for example, bridges, routers, switches, hubs, and/or gateways. For example, client device 410 can be operatively coupled to a cellular network (not shown in FIG. 4) and network service 490 can be operatively coupled to a fiber-optic network (not shown in FIG. 4). The cellular network and fiber-optic network can each be operatively coupled one to another via one or more network bridges, routers, switches, and/or gateways such that the cellular network and the fiber-optic network are operatively coupled to form a communications link. Alternatively, the cellular network and fiber-optic network can each be operatively coupled one to another via one or more additional networks. For example, the cellular network and the fiber-optic network can each be operatively coupled to the Internet such that the cellular network, the fiber-optic network and the Internet are operatively coupled to form a communications link.

Network service 490 includes network service element 450, network service element 460, communications 440, location registry 480, and registration module 470. Network service element 450 is generally a computing device that includes cryptographic module 454 and data store 455. Network service element 460 is generally a computing device that includes cryptographic module 464 and data store 465. Cryptographic modules 454 and 464 are hardware modules and/or software modules stored at a memory and executed at a processor and provide cryptographic services such as encryption, decryption, cryptographic hashing, cryptographic key storage, digital certificate management, and/or other cryptographic services. Cryptographic modules 454 and 464 can each include, for example, a trusted platform module ("TPM") or other hardware-based cryptographic module that includes a cryptographic key and/or digital certificate unique to that hardware-based cryptographic module. Thus, a cryptographic key or other cryptographic information can be physically associated with or bound to a network service element (e.g., physically coupled to a computing device hosting the network service element). In some embodiments, such a cryptographic key and/or digital certificate can be globally unique such that no other cryptographic module includes the same cryptographic key and/or digital certificate. In some embodiments, such a cryptographic key and/or digital certificate can be unique to a cryptographic module within a network service or group of network services such that no other cryptographic module within that network service or group of network services includes the same cryptographic key and/or digital certificate.

Data stores 455 and 465 can be hard disks, databases, object-based storage devices, and/or other devices, services, or media at which network service entities 450 and 460, respectively, can store and access data. Although data stores 455 and 465 are illustrated as included within network service elements 450 and 460, respectively, data stores 455 and/or 465 can be external to network service elements 450 and 460, respectively. For example, data stores 455 and/or 465 can be external to network service elements 450 and 460, respectively, and accessible to network service elements 450 and 460, respectively, via a storage area network ("SAN").

Network service 490 also includes location registry 480. Location registry 480 stores location records such as location records generated at network service elements 450 and 460 within network service 490. For example, location registry 480 can store location records as discussed above in relation to FIG. 3.

Figure 6:
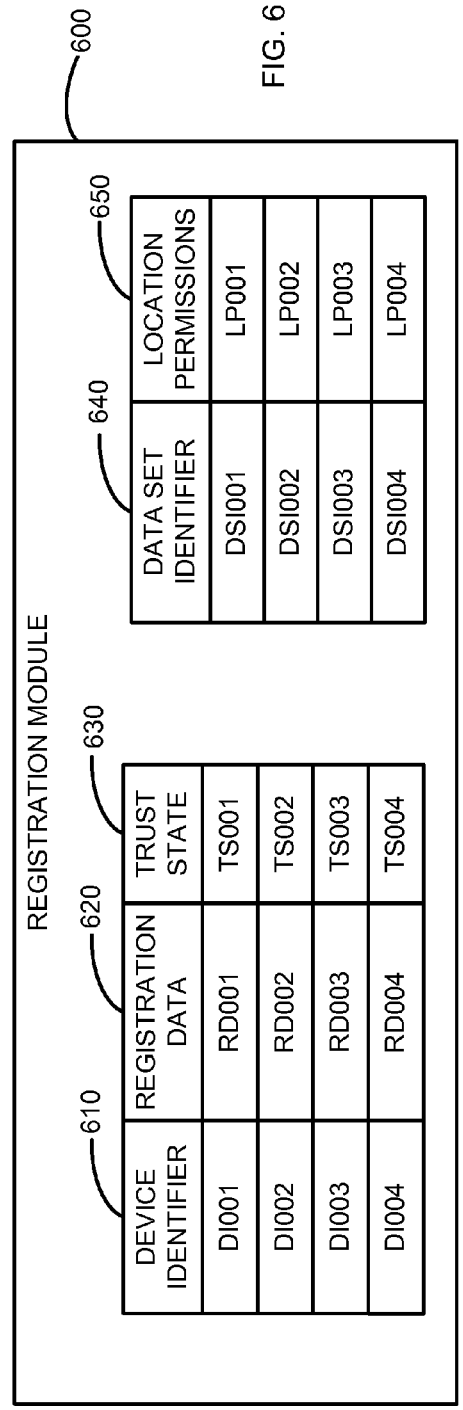
FIG. 6 is an illustration of a registration module, according to an embodiment.

Registration module 470 manages registration information, location information, state information, and/or other information related to network service modules 450 and 460 and/or data sets stored within network service 490. For example, FIG. 6 is an illustration of a registration module, according to an embodiment. Registration module 600 includes two groups of information related to network service elements and data sets. The first group of information includes a device identifiers 610, registration data 620, and trust states 630. Device identifiers 610 can be names, URIs, addresses such as a MAC addresses, or other identifiers of a network service element. Registration data 620 can include registration information such as a digital certificate or some other credential provided to registration module 600 to authenticate the identity of a network service element or register the network service element with registration module 600. Furthermore, registration data 620 can include location information related to the location (i.e., the physical location) of the network service element. Trust state 630 includes state information related to the operational state of the network service element. For example, trust state 630 can include a digest (e.g., a cryptographic hash value) of a software module that is hosted at the network service element.

As illustrated in FIG. 6, device identifiers 610, registration data 620, and trust states 630 are organized as a table. Each row in the table is related to a particular network service element. For example, device identifier DI001 can be an identifier of a network service element that provided registration data RD001 and trust state TS001 to registration module. Similarly, device identifier DI002 can be an identifier of a network service element that provided registration data RD002 and trust state TS002 to registration module. Additionally, device identifier DI003 can be an identifier of a network service element that provided registration data RD003 and trust state TS003 to registration module.

The second group of information includes data set identifiers 640 and location permissions 650. Data set identifiers 640 include identifiers such as digests or cryptographic hash values uniquely identifying a data set. Data set identifiers 640 can also include identifiers such as URIs of data sets such as URIs derived from client identifiers of a client sending a particular data set to a network service and a client-specified name of that data set. Location permissions 650 include limitations on the locations at which a particular data set or data set sent to the network service from a client can be stored. For example, a client of the network service can specify that data received by the network service from that client can be stored only in specified locations or that such data cannot be stored in particular locations. Such limitations or restrictions can be stored at location permissions 650.

Similar to the first group of information, data set identifiers 640 and location permissions 650 are organized as a table. Each row in the table is related to a particular data set. For example, data set identifier DSI001 can be an identifier of a data set for which location permissions LP001 have been specified. Similarly, data set identifier DSI002 can be an identifier of a data set for which location permissions LP002 have been specified. Additionally, data set identifier DSI003 can be an identifier of a data set for which location permissions LP003 have been specified.

In some embodiments, a registration module can include a table or database that stores the present location of data sets within a network service. This table can be accessed to determine a present location of a data set within the network service. For example, the table including data set identifiers 640 and location permissions 650 can also include location information for each data set. Location information for each data set can include, for example, a device identifier of the network service element at which that data set is presently stored or located, the most recent location record generated within the network service for that data set, an identifier of the physical location of the network service element at which that data set is presently stored or located, and/or other location information. As another example, a location registry can forward location records to the registration module (or network service elements can send location records to the registration module) and the registration module can include a table of location records including the most recently generated location records for data sets within the network service.

Referring to FIG. 4, generally, registration module 470 is implemented or hosted at a computing device. Thus, registration module 470 can be a hardware module and/or a software module stored at a memory of a computing device and executing at a processor. In some embodiments, registration module 470 can be a service (i.e., a network service) accessible to network service 490. Additionally, registration module 470 can be distributed across multiple computing devices. In other words, registration module 470 can be replicated at multiple computing devices and/or one computing device can implement some functions of registration module 470 (e.g., functions related to network service elements) and another computing device can implement other functions of registration module 470 (e.g., functions related to data sets). Accordingly, registration module 600 illustrated in FIG. 6 is a logical representation of a registration module.

Additionally, network service 490 includes communications link 440. Network service elements 450 and 460, location registry 480, and registration module 470 are operatively coupled one to another via communications link 440. Similar to communications link 430, communications link 440 can include any connector and/or system that allow network elements 450 and 460, location registry 480, and registration module 470 to communicate one with another and/or with client devices 410 and 420 via communications link 430. Additionally, communications link 440 can include a communications network or combination of communications networks capable of transmitting information (e.g., symbols or signals representing data) such as, for example, an Ethernet network, a fiber-optic network, a wireless network, an intranet, and/or the Internet. In some embodiments, communications link 440 can be coupled to communications link 430 directly as illustrated in FIG. 4, or indirectly via, for example, a gateway, bridge, firewall, and/or other device or service (not shown).

Figure 7:
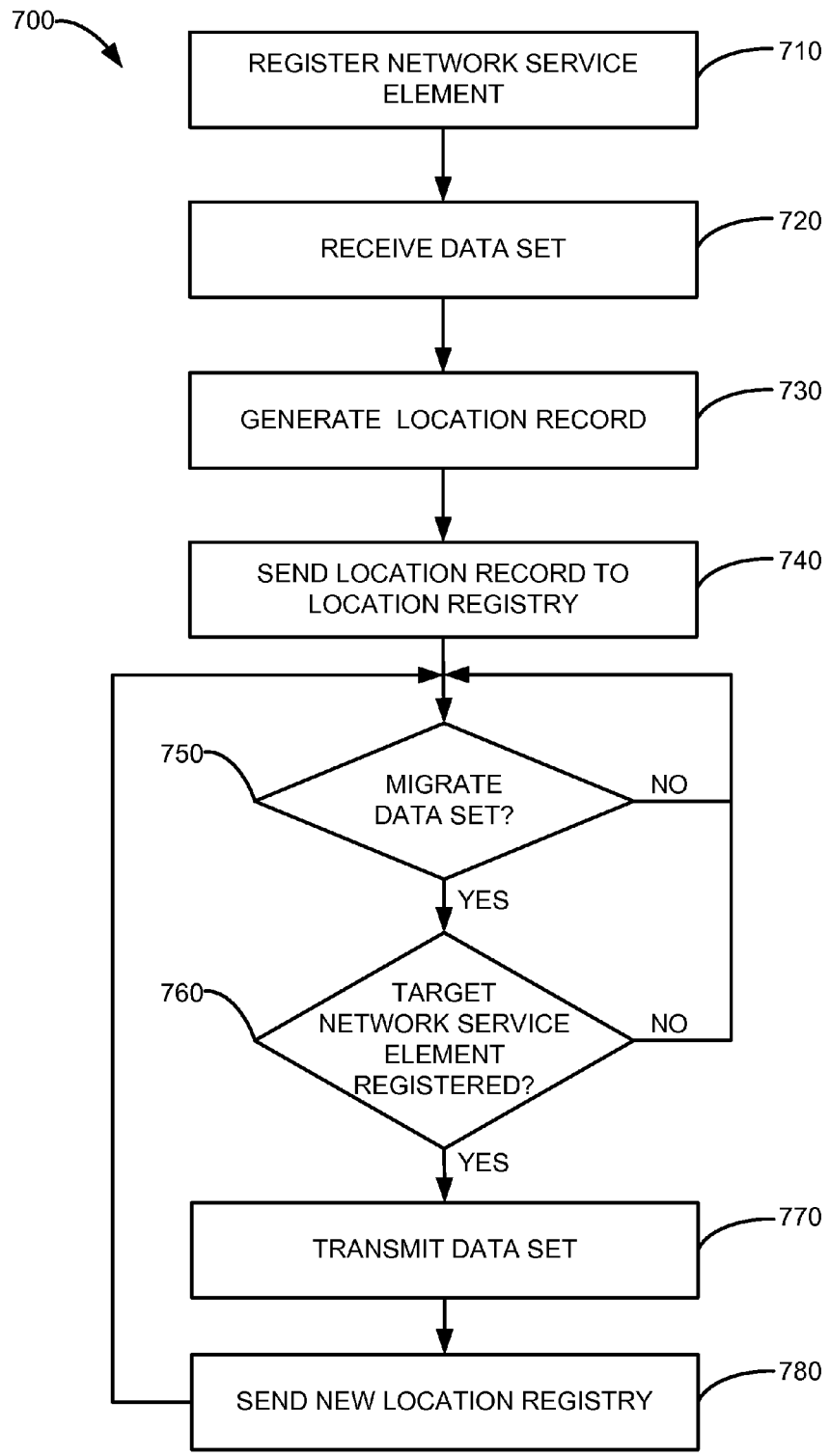
FIG. 7 is a flowchart of a process to manage location information related to a data set, according to an embodiment.

FIG. 7 is a flowchart of a process to manage location information related to a data set, according to an embodiment. Process 700 can be implemented as a hardware module and/or a software module. For example, process 700 can be implemented as application-specific circuitry or as a software module including instructions stored at a memory and executed at a processor in communication with the memory. More specifically, for example, process 700 can be implemented as a virtual machine hosted at a network service element.

The network service element registers with a registration module of a network service at block 710. The network service element can, for example, send a registration request including registration information to the registration module via a communications link. The registration information of the registration request can include various information related to the network service element such as an identifier of the network service element, a digital certificate associated with the network service element, a cryptographic key, location information related to a physical location of the network service element, and/or other information related to the network service element. Additionally, state information related to an operational state of the network service element can be sent to registration module during registration of the network service element. For example, the state information can be a cryptographic hash value generated by application of a cryptographic hash function to the instructions defining a virtual machine implementing process 700. The registration information, location information, state information, and/or other information sent to the registration module can be stored at the registration module to register the network service element.

In some embodiments, the registration module can confirm (i.e., verify and/or validate) information related to the network service element before the network service element is registered. For example, the network service element can send a digital certificate to the registration module and the registration module can or validate the digital certificate with a certificate authority. Similarly, the registration module can verify an operational state of the network service element based on state information sent by the network service element (e.g., whether the state information satisfies one or more trust criteria). For example, the registration module can determine whether a cryptographic hash value based on a software module hosted at the network service element is equivalent to a predetermined cryptographic hash value for that software module. If the digital certificate and/or other information provided by the network service element cannot by or is not confirmed, the registration module can deny the registration request and not register the network service element (e.g., by not storing the information sent by the network service element at the registration module).

In some embodiments, registration can be federated or cooperative. For example, one or more network service elements can authenticate (e.g., confirm an identity or operating state of) a network service element, and those network service elements can notify the registration module that that network service element can be registered with and/or trusted by the registration module. As another example, a registration module can determine whether a network service element can be or is trusted within a network service by requesting from network service elements registered with and/or trusted by the registration module identifiers of the network service elements that are trusted (e.g., have been verified and/or validated) by those network service elements. In other words, the registration module can determine that a network service element is a part of a network service (e.g., is trusted within the network service) if other network service elements within the network service trust that network service element.

After the network service element is registered with the registration module, the network service element can be used within the network service. That is, the network service can provide data to the network service element to be stored and/or processed. Said differently, the network service element can be a member or part of the network service after the network service element is registered with the registration module of the network service. In other words, the network service element can be trusted by the network service after the network service element is registered.

In some embodiments, a network service element can receive an identifier from the registration module after the network service module is registered with the registration module. For example, the registration module can associate a device identifier that identifies the network service element within the network service with the network service element. Alternatively, the device identifier of a network service element can be an address such as a network address or MAC address of the network service element. Such a device identifier can be referred to as a trusted device identifier.

After the network service element is registered with the registration module, the network service element can be used within the network service. That is, the network service can provide data to the network service element to be stored and/or processed. Said differently, after the network service element is registered with the registration module of the network service the network service element can be a member or part of the network service. In other words, the network service element can be trusted by the network service and the network service can send data sets to the network service element for storage and/or processing.

As illustrated in FIG. 7, a data set is received by a network service element at block 720. A location record is generated from the data set at block 730 and the location record is sent to a location registry at block 730. For example, a location record can be generated for the data set received at block 720 and sent to a location registry as discussed above in relation to FIG. 1.

The network service element implementing process 700 waits or loops at block 750 until the data set should be migrated. For example, the network service element can wait at block 750 to receive a command, instruction, or signal from the network service indicating to the network service element migrate the data set. After an instruction to migrate the data set is received at block 750, the network service element can determine whether a target network service element (i.e., the network service element to which the data set should be migrated) is registered with the registration module at block 760. In other words, the network service element can communicate with the registration module to determine whether the target network service element is registered with and/or trusted by the registration module based on, for example, a device identifier of the target network service module. For example, the network service element can request affirmation from the registration module that the target network service element is registered with and/or trusted by the registration module.

If the target network service module is not registered with and/or trusted by the registration module, the registration module can repudiate the target network service and the data set is not migrated and process 700 returns to block 750. If the target network service module is registered with and/or trusted by the registration module, the registration module can send an affirmation that the network service module is registered with and/or trusted by the registration module to the network service element, and the network service element implementing process 700 can determine whether the target network service module is authorized to receive and/or store the data set. For example, the network service module can query the registration module for location permissions related to the data set. More specifically, for example, the registration module or the network service element can determine whether the data set can be migrated to the target network service element based on location information related to the target network service element and location permissions related to the data set. If the location permissions of the data set do not restrict storage of the data set from the location of the target network service element, the target network service element can be authorized for migration (i.e., receipt and/or storage) of the data set. In some embodiments, the registration module can affirm (i.e., send an affirmation) to the network service element that the target network service element is authorized to receive and/or store the data set and can repudiate authorization to store the data set at the target network service element if the target network service element is not authorized.

If the target network service element is not authorized to receive the data set, the data set is not migrated and process 700 returns to block 750. If the target network service element is authorized to receive the data set, the data set can be migrated to the target network service element. For example, the data set can be transferred to the target network service element via a communications link and then removed or deleted from the source network service element.

After the data set is migrated to the target network service element, a location record associated with storage of the data set at the target network service element is generated and sent to the location registry. For example, the target network service element can generate a location record as discussed above in relation to FIG. 1. In some embodiments, the source network service element (i.e., the network service element from which the data set was migrated) can generate the location record and send the location record to the location registry.

Process 700 can include more or fewer blocks than illustrated in FIG. 7. Additionally, one or more blocks can be rearranged. For example, process 700 can include a block (not shown) at which the network service element receives a response related to the registration of block 710 indicating whether the network service element was registered with a registration module. As another example, process 700 can include a block (not shown) at which the network service element requests an identifier for a target network service element after block 750. In some embodiments, the location record can be generated before block 780 (e.g., after block 770 and before block 780). Furthermore, a network service element waiting at block 750 to migrate a data set can receive additional data sets. In other words, an instance of process 700 can be associated with each data set stored at a network service element. Moreover, if the target network service element is not registered with and/or trusted by the registration module at block 760 or if the target network service element is not authorized to receive and/or store the data set at block 770 the network service element or the registration module can select another target network service element and return to block 760.

Figure 8:
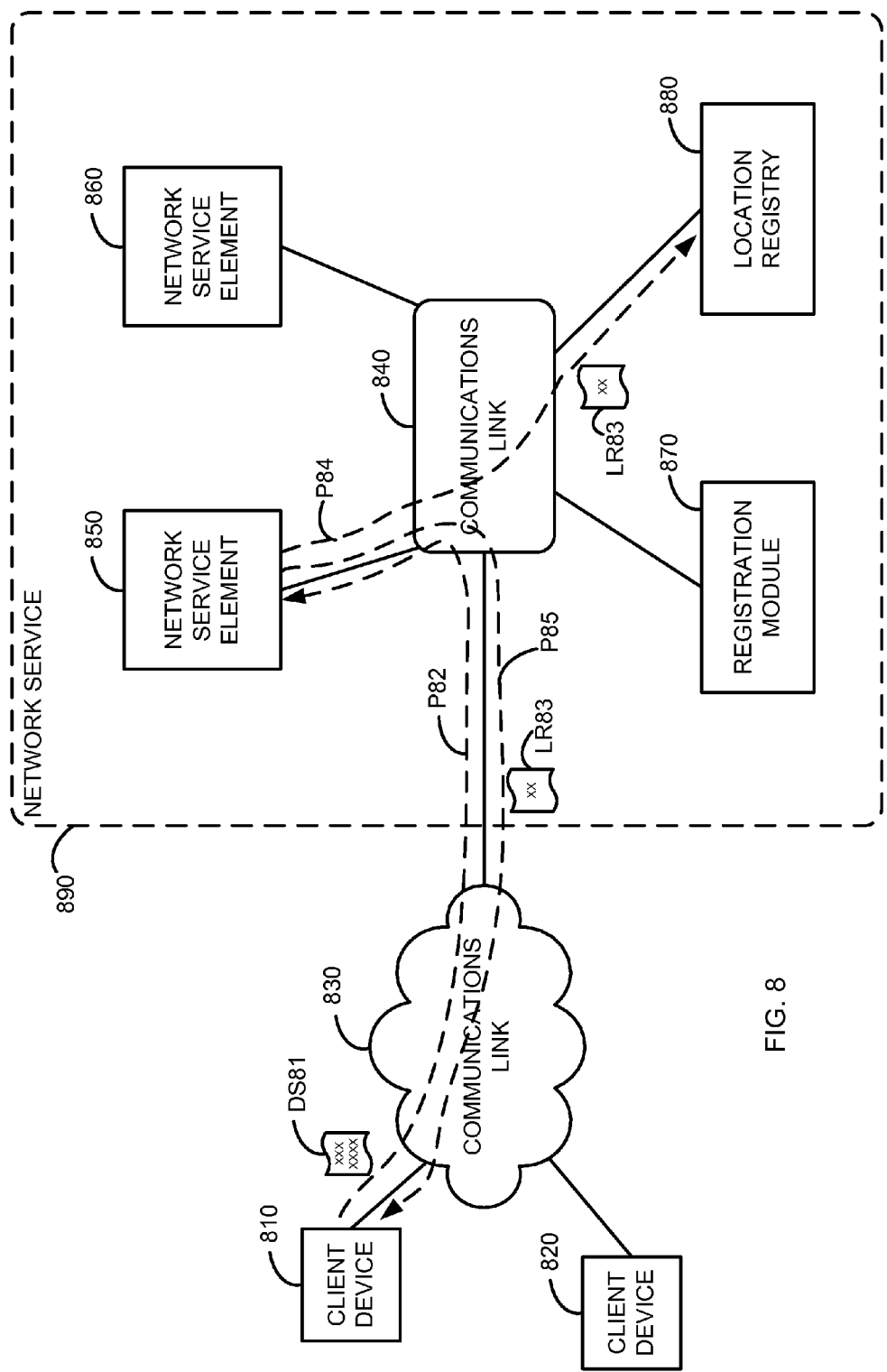
FIG. 8 is a schematic block diagram of a communication flow of location information related to a data set within a system including a network service, according to an embodiment.

FIG. 8 is a schematic block diagram of a communication flow of location information related to a data set within a system including a network service, according to an embodiment. The communication flow of FIG. 8 illustrates storage of a data set at a network service element. The system illustrated in FIG. 8 includes client device 810, client device 820, communications link 830 and network service 890. Network service 890 includes network service element 850, network service element 860, communications link 840, location registry 880, and registration module 870. Path P82, path P84, and path P85 illustrate communication paths within the system illustrated in FIG. 8. These communication paths are logical and do not necessarily indicate each physical computing device or network device traversed by the data symbols or data signals transmitted along the communication paths.

Data set DS81 is sent from client device 810 to network service element 850 along path P82. Network service element 850 receives data set DS81, stores data set DS81 at a data store (not shown) of network service element 850, and generates location record LR83 to account for or memorialize the storage of data set DS81 at network service element 850. Network service element 850 then sends location record LR83 to location registry 880 along path P84. Additionally, network service element 850 sends location record LR83 to client device 810 along path P85. Thus, location registry 880 and client device 810 receive location record LR83 which confirms that data set DS81 is stored at network service element 850.

Figure 9:
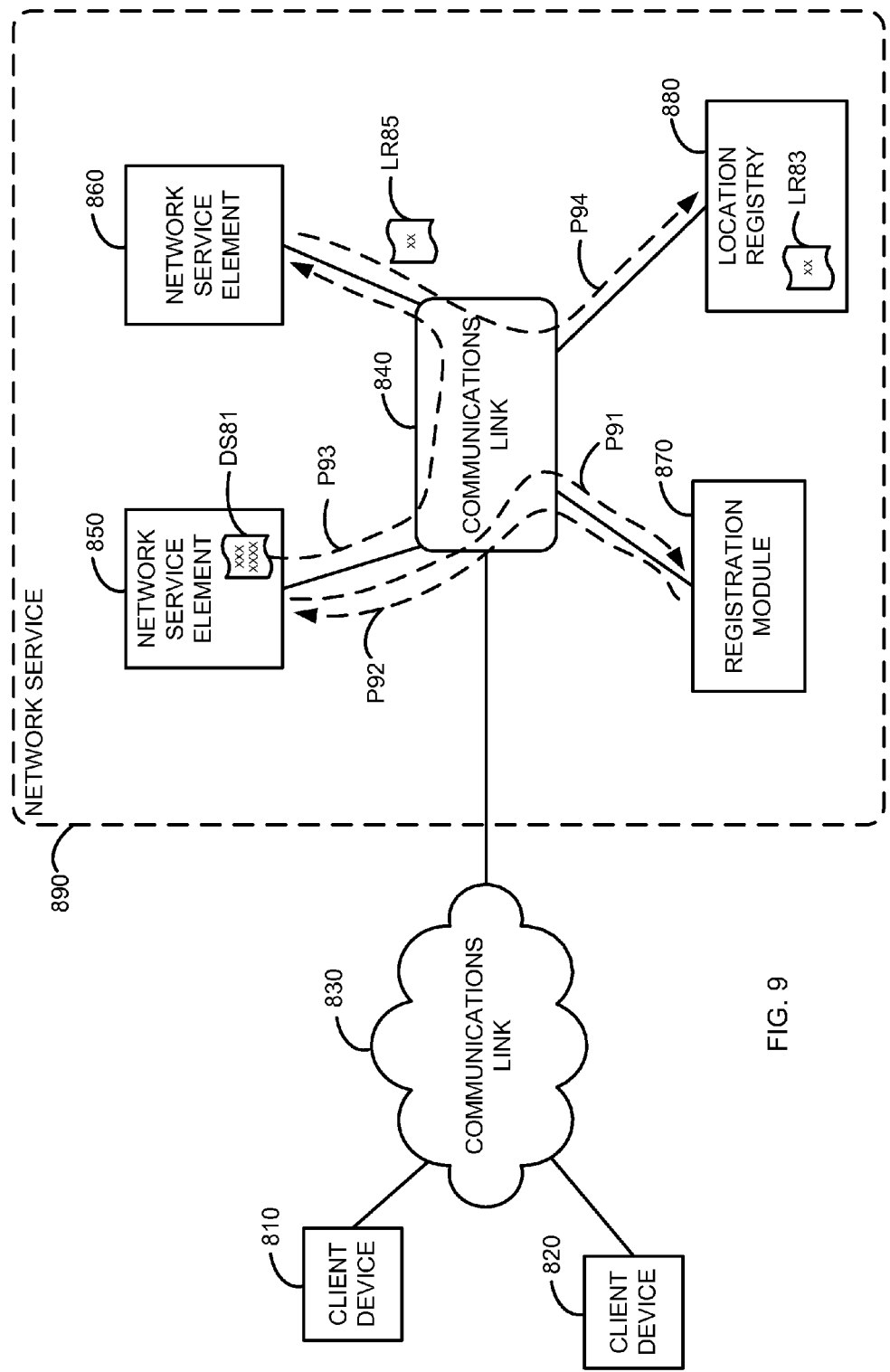
FIG. 9 is a schematic block diagram of another communication flow of location information related to a data set within the system including a network service of FIG. 8, according to an embodiment.

FIG. 9 is a schematic block diagram of another communication flow of location information related to a data set within the system including a network service of FIG. 8, according to an embodiment. The communication flow of FIG. 9 illustrates migration of a data set within a network service. The system illustrated in FIG. 9 includes client device 810, client device 820, communications link 830 and network service 890. Network service 890 includes network service element 850, network service element 860, communications link 840, location registry 880, and registration module 870. Path P91, path P92, path P93, and path P94 illustrate communication paths within the system illustrated in FIG. 9. These communication paths are logical and do not necessarily indicate each physical computing device or network device traversed by the data symbols or data signals transmitted along the communication paths.

Network service element 850 sends a request for an affirmation that data set DS81 can be migrated to network service element 860 to registration module along path P91. For example, network service element 850 can request affirmation that network service module 860 is registered with and/or trusted by registration module. Also, network element 850 can request affirmation that network service module 860 is in a particular operational state.

Registration module 870 determines whether it can provide the requested affirmation (i.e., whether network service module 860 is registered with and/or trusted by registration module 870 and/or whether network service element 860 is in a particular operational state) and affirms or denies that data set DS81 can be migrated to network service element 860 along path P92. In some embodiments, registration module 870 (or another component (not shown) of network service 890) can query an operational state of network service element 860 via communications link 840 in response to the request from network service element 850. In other words, registration module 870 can communicate with network service element 860 and request that network service element 860 sent an operational state to registration module 870 via 840. Thus, registration module 870 can access an operational state of network service element 860 in real-time (i.e., the operational state of network service element 860 is accessed or updated when requested).

After network service element 850 receives the affirmation from registration module 870, network service element 850 sends data set DS81 to network service element 860 along path P93. Network service element 860 receives data set DS81, stores data set DS81 at a data store (not shown) of network service element 860, and generates location record LR85 to account for or memorialize the storage of data set DS81 at network service element 860. Network service element 860 then sends location record LR85 to location registry 880 along path P94. Thus, location registry 880 receives location record LR85 which confirms that data set DS81 is stored at network service element 860. As illustrated in FIG. 9, location record LR83 remains at location registry 880 to record the storage of data set DS81 at network service element 850. Additionally, network service element 860 can send (not shown) location record LR85 to client device 810.

In some embodiments, location records LR83 and LR85 can include a timestamp, sequence number or code, or some other indication that data set DS81 was stored at network service element 850 at a first time and at network service element 860 at a second time after the first time. Thus, a location register related to data set DS81 can attest to or describe that data set DS81 was stored at network service element 850 at a first time and at network service element 860 at a second time after the first time. In other words, the timestamp can indicate at what time the actions (e.g., storage, migration, and/or deletion) related to data set DS81 in response to which location records LR83 and/or LR85 were generated occurred. Additionally, location records LR83 and LR85 can include one or more annotations to describe an action associated with data set DS81. For example, location record LR83 can include an annotation indicating that data set DS81 was migrated from network service element 850, and location record LR85 can include an annotation indicating that data set DS81 was migrated to network service element 860.

Furthermore, timestamps and/or annotations at location records can distinguish, for example, storage of a data set at a network service element at different times. For example, a data set can be stored at a first network service element at a first time and a first location record including a timestamp associated with the first time to memorialize the presence of the data set at the first network service element at the first time can be generated at the first network element and stored at a location registry. At a second time, the data set can be stored at a second network service element and a second location record including a timestamp associated with the second time to memorialize the presence of the data set at the second network service element at the second time can be generated at the second network element and stored at the location registry. At a third time, the data set can be stored at the first network service element and a third location record including a timestamp associated with the third time to memorialize the presence of the data set at the first network service element at the third time can be generated at the first network element and stored at the location registry. Thus, a location register including the first location record, the second location record, and the third location record can uniquely memorialize the presence of the data set at the first network service element, at the second network service element, and again at the first network service element, respectively.

In some embodiments, location record LR83 can include an annotation indicating that data set DS81 was migrated to network service element 860 and also remains (e.g., as a redundant copy) at network service element 850, and location record LR85 can include an annotation indicating that data set DS81 was migrated to network service element 860. Additionally, location record LR85 can include an annotation indicating that data set DS81 (or a copy of data set DS81) remains at network service element 850.

Moreover, data set DS81 can be deleted from network service 890 and location record LR83 and/or location record LR85 can include an annotation to memorialize the deletion of data set DS81. As an example, location record LR83 can include an annotation to record storage of data set DS81 and another annotation to record migration of data set DS81 from network service element 850 (or a single annotation recording the storage and migration) and location record LR85 can include an annotation to record migration of data set DS81 to network service element 860. Location record LR85 can also include an annotation to record deletion of data set DS81 from network service 890. Alternatively, location registry 880 can include the annotation to record migration of data set DS81 to network service element 860 and an annotation to record migration of data set DS81 from network service element 860, and another location record (not shown) at location registry 880 can include an annotation to record deletion of data set DS81 from network service 890.

In some embodiments, migration of data within a network service can be requested and/or initiated by a client of the network service. For example, a client device can send a request to a registration module to migrate a data set from a source network service element (or from a source physical location) to a target network service element (or to a target physical location). The request can include can include an identifier of the data set, a name or URI to identify a requested data set, and/or a credential (e.g., a password or a digital certificate) to demonstrate a permission or right to access the requested data set. Furthermore, the request can include a location record related to present (or past) storage of the data set at a network service element to identify the data set. For example, referring to FIG. 8, client device 810 can send location record LR83 and an identifier of network service element 860 to registration module 870 to request the migration (illustrated in FIG. 9) of data set DS81 from network service element 850 to network service element 860.

Figure 10:
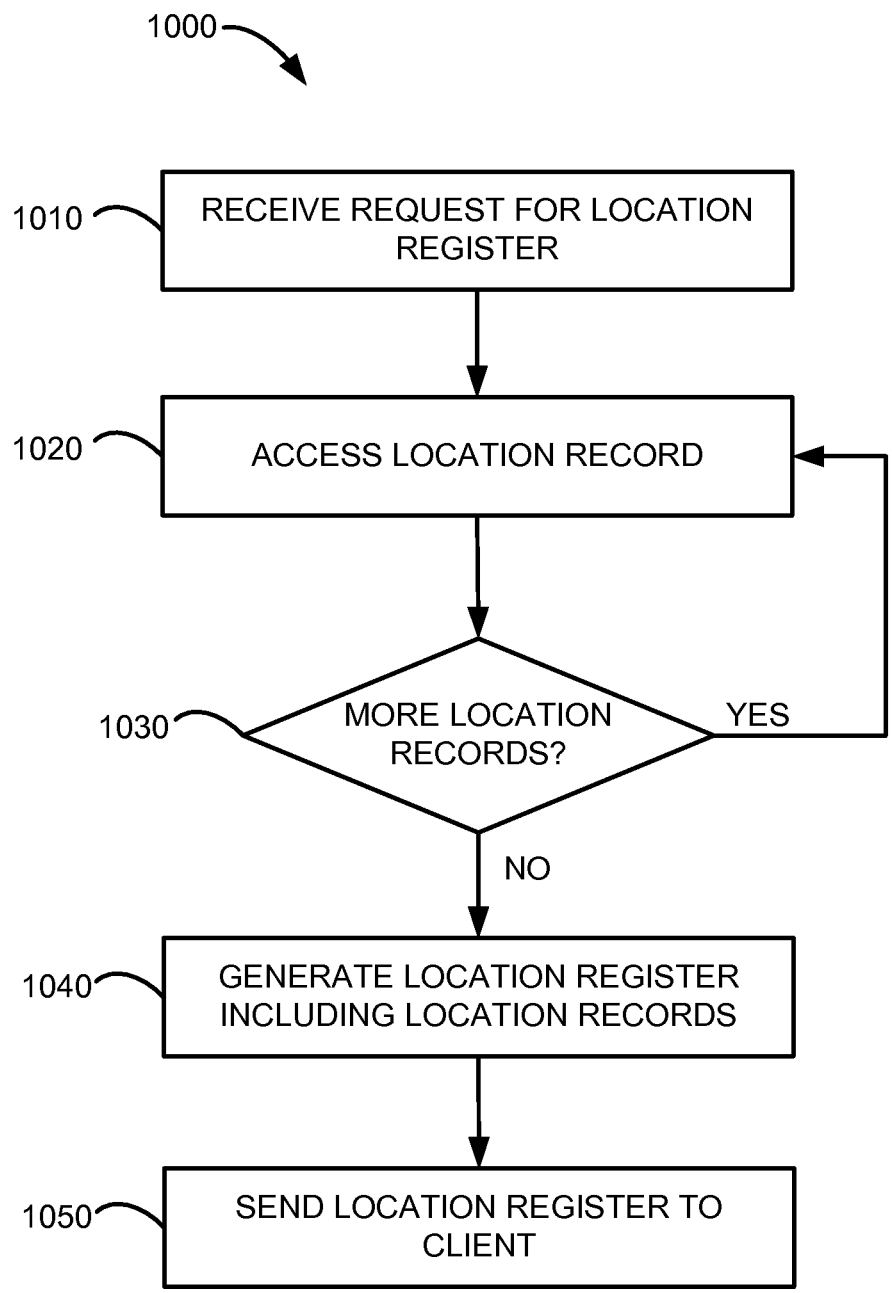
FIG. 10 is a flowchart of a process to provide location information related to a data set to a client device, according to an embodiment.

FIG. 10 is a flowchart of a process to provide location information related to a data set to a client device, according to an embodiment. Process 1000 can be implemented as a hardware module and/or a software module. For example, process 1000 can be implemented as application-specific circuitry or as a software module including instructions stored at a memory and executed at a processor in communication with the memory. More specifically, for example, process 1000 can be implemented at a registration module, at a location registry, and/or collectively at a registration module and at a location module. Process 1000 will be discussed in relation to a location registry, but as noted above process 1000 can be implemented at a registration module, at a location registry, collectively at a registration module and at a location module, and/or at another hardware module and/or software module.

Figure 11:
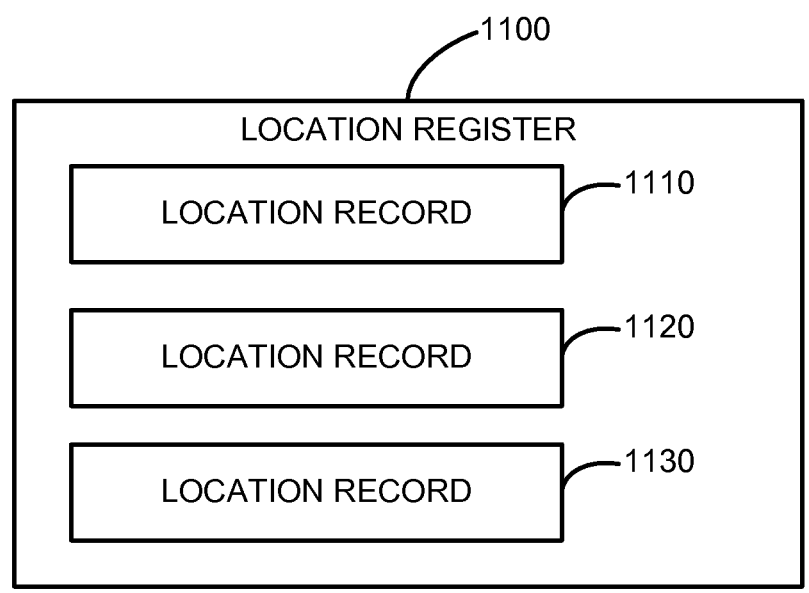
FIG. 11 is an illustration of a location register, according to an embodiment.

A location registry receives a request for a location register at block 1010. A location register is a group or aggregation of location records. For example, FIG. 11 is an illustration of a location register, according to an embodiment. Location register 1100 includes location record 1110, location record 1120, and location record 1130. Location register 1100 can be related to a particular network service element and location records 1110, 1120, and 1130 can be related to storage of one or more data sets at that particular network service element. Location register 1100 can also be related to a particular data set such that location records 1110, 1120, and 1130 can be related to storage of that particular data set at one or more network storage elements. In some embodiments, location register 1100 can be independent of a particular network storage element or particular data set. For example, location register 1100 can include all the location records at a location registry and/or an unsorted or unfiltered set of location records at the location registry. In some embodiments, a request for a location register can be a request for a specific location record or set of location records. For example, the request for the location register can request the location record related to the current location of a single data set or a group of data sets stored at a network service.

Referring to FIG. 10, the location registry determines which location records to access in response to the request received at block 1010. For example, the request received at block 1010 can include a data set identifier and each location record related to the data set having that identifier can be included in the location register. In some embodiments, the request received at block 1010 can include a device identifier and each location record related to the network service element having that device identifier can be included in the location register. The location records can then be accessed at block 1020 and included in the location register. For example, a location record can be copied into a temporary data repository from which the location register will be generated. If more location records should be accessed for inclusion in the location register at block 1020 (e.g., there are more location records for a specified data set or network service element), process 1000 returns to block 1020 and another location record is accessed.

If all the location records for the location register have been accessed at blocks 1020 and 1030, the location register is generated to include the accessed location records at block 1040. For example, location records stored at a temporary data repository can be copied or moved to a file representing the location register. The generated location register can then be sent to the client requesting the location register at block 1050.

Process 1000 can include more or fewer blocks than illustrated in FIG. 10. Additionally, one or more blocks can be rearranged. For example, process 100 can include a block (not shown) at which the location registry determines whether a client is authorized to request and/or receive a particular location register. More specifically, for example, a client can provide one or more credentials to authenticate the client with the location registry or demonstrate sufficient permissions to request and/or receive the register. In some embodiments, records accessed at block 1020 can be inserted directly into a location register such that the location register is generated before block 1020 and the location records are included in the location register at block 1020. Thus, block 1040 can be removed from process 1000.

Figure 12:
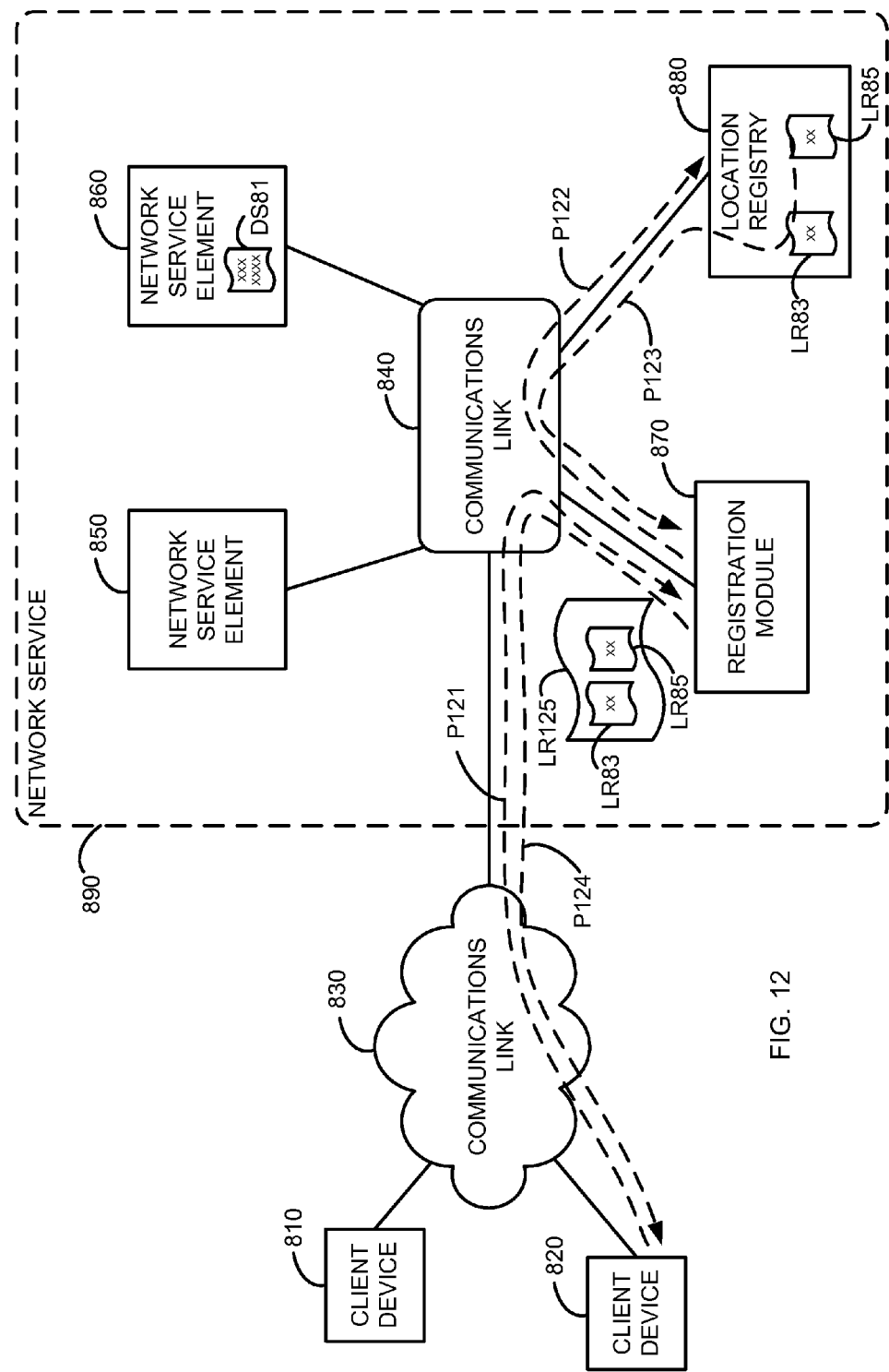
FIG. 12 is a schematic block diagram of a communication flow of a location register within the system including a network service of FIG. 8, according to an embodiment.

FIG. 12 is a schematic block diagram of a communication flow of a location register within the system including a network service of FIG. 8, according to an embodiment. The system illustrated in FIG. 12 includes client device 810, client device 820, communications link 830 and network service 890. Network service 890 includes network service element 850, network service element 860, communications link 840, location registry 880, and registration module 870. Path P121, path P122, path P123, and path P124 illustrate communication paths within the system illustrated in FIG. 12. These communication paths are logical and do not necessarily indicate each physical computing device or network device traversed by the data symbols or data signals transmitted along the communication paths.

Client device 820 sends a request for a location register to registration module 870 along path P121. The request includes a data set identifier related to the data set for which client device 820 requests the location register. In other words, the data set identifier identifies the data set to which the requested location register relates. Registration module 870 receives the request and determines that client device 820 is authorized to access (e.g., request and/or receive) the location register. For example, the request can include a username and a password and/or a digital certificate related to authorized access to the location register.

If client device 820 is authorized to access the location register, registration module 870 accesses the location records at location registry 880 related to the data set for which the location register is requested along path P122. For example, in connection with the discussions related to FIGS. 8 and 9 above, client device 820 can request a location register related to data set DS81. Thus, registration module 870 can request location records LR83 and LR85 related to storage of data set DS81 at network service elements 850 and 860, respectively, at location registry 880, and location registry 880 can provide location records LR83 and LR85 to registration module 870 along path P123. As discussed above, for example, in relation to FIG. 9, location records LR83 and LR85 can memorialize storage of data set DS81 at network service elements 850 and 860, movement of data set DS81 to and/or from network service elements 850 and 860, deletion of data set DS81 from network service elements 850 and/or 860, and/or redundant storage of data set DS81 at network service elements 850 and 860.

Registration module 870 then generates location register LR125 including the location records for that location register accessed at location registry 880. In the preceding example and as illustrated in FIG. 12, location register LR125 includes location records LR83 and LR85 related to storage of data set DS81 at network service elements 850 and 860, respectively. In some embodiments, location register LR125 can be a list or sequence of location records without additional data or formatting. In other embodiments, location register LR125 can be a file including one or more location records that have been altered to, for example, correspond to a format of the location register. In yet other embodiments, location register LR125 can include other arrangements and/or configurations of location records. As discussed above, for example, in relation to FIG. 9, location records such as location records LR83 and LR85 memorialize (or define a log or history) of the network service elements at which a data set such as data set DS81 is stored within a network service. Additionally, location records can memorialize deletion (or removal) of a data set from a network service element. Because location records are generated at network service elements that are registered and/or trusted within a network service and can cryptographically sign the location records, location register LR125 can be used to audit or track movement of a data set within that network service. In other words, location register LR125 is a history or record of the locations of a data set (e.g., network service elements at which the data set was stored and/or traversed) within a network service.

Location record LR125 is sent from registration module 870 to client device 820 along path P124. Client device 820 can then examine location register LR125 to determine (or audit) at which network service elements within network service 890 data set DS81 has been and/or is stored. For example, client device 820 can request and receive (not shown) digital certificates related to network service elements 850 and 860 from network service elements 850 and 860, respectively, and/or from registration module 870. The digital certificates can include cryptographic keys to decrypt the encrypted signatures of location records LR83 and LR85. Client device 820 can verify or validate the digital certificates with a certificate authority and use the cryptographic keys included in the digital certificates to decrypt location records LR83 and LR85 to determine the device identifiers of the network service elements at which data set DS81 has been or is stored (i.e., network service elements 850 and 860 in the preceding example).

In some embodiments, client device 820 can access the location information related to the network service elements at which data set DS81 has been or is stored at registration module 870. For example, client device 820 can request location information from registration module 870 related to network service element 850 and network service element 860 in response to receiving location records LR83 and LR85 within location register LR125, and registration module 870 can send the location information to client device 820. In other embodiments, location information related to the network service elements at which data set DS81 has been or is stored is included within a location record or location register. For example, registration module can include the location information related to the network service elements at which data set DS81 has been or is stored in location register LR125. As an alternative example, the location information can be included in location records LR83 and/or LR85 when these location records are generated at network service elements 850 and 860, respectively, or when registration module includes location records LR83 and/or LR85 within location register LR125.

Figure 13:
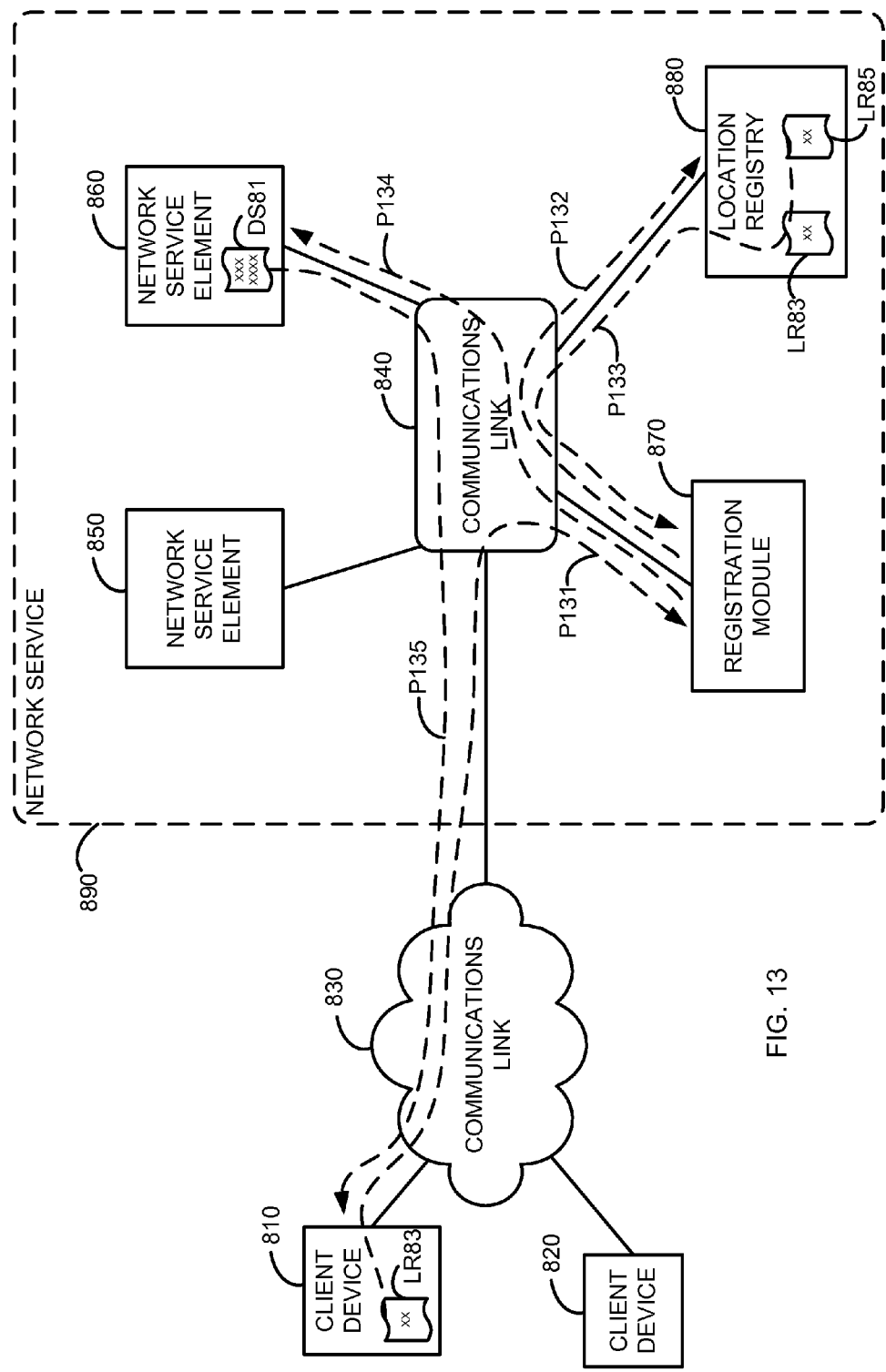
FIG. 13 is a schematic block diagram of another communication flow of location information related to a data set within the system including a network service of FIG. 8, according to an embodiment.

FIG. 13 is a schematic block diagram of another communication flow of location information related to a data set within the system including a network service of FIG. 8, according to an embodiment. The system illustrated in FIG. 13 includes client device 810, client device 820, communications link 830 and network service 890. Network service 890 includes network service element 850, network service element 860, communications link 840, location registry 880, and registration module 870. Path P131, path P132, path P133, path 134, and path P135 illustrate communication paths within the system illustrated in FIG. 13. These communication paths are logical and do not necessarily indicate each physical computing device or network device traversed by the data symbols or data signals transmitted along the communication paths.

FIG. 13 illustrates network service 890 and client device 810 after data set DS81 has been initially stored at network service element 850 (e.g., as illustrated in FIG. 8) and migrated to network service element 860 (e.g., as illustrated in FIG. 9). Location record LR83 was generated in response to storage of data set DS81 at network service element 850 and was sent to client device 810 and location registry 880. Location record LR85 was generated in response to storage of data set DS81 at network service element 860 and was sent to location registry 880.

Client device 810 sends a request for access to data set DS81 (or an access request for data set DS81) to registration module along path P131. As illustrated in FIG. 13, the access request includes location record LR83. Location record LR83 can be referred to as an access location record and can be included with the access request to identify data set DS81 and/or as a credential to demonstrate a permission or right to access data set DS81.

Registration module 870 receives the access request including location record LR81 and accesses location registry 880 to verify and/or validate location record LR83. For example, registration module 870 can send location record LR83 to location registry 880 along path P132 and location registry 880 can compare location record LR83 with location records stored at location registry 880. As illustrated in FIG. 13, location registry 880 can compare location record LR83 received along path P132 from registration module 870 with location records LR83 and LR85 stored at location registry 880. Location registry 880 can then report to registration module 870 along path P133 whether a match for location record LR83 is included at location registry 880. In other words, location registry 880 can verify to registration module 870 that location record LR83 was generated within network service 890.

In some embodiments, registration module 870 can also validate location record LR83 received from client device 810 by decrypting an encrypted signature of location record LR83 using, for example, a cryptographic key stored at registration module 870 and related to a network service element identified by location record LR83. For example, registration module 870 can receive a digital certificate including a public key from network service element 850 when network service element 850 registers with registration module 870, and location record LR83 can include an encrypted signature encrypted using a private key (from a public/private key pair with the public key included in the digital certificate) of network service element 850. Registration module 870 can decrypt the encrypted signature of location record LR83 using the public key from the digital certificate to access a data set digest for the requested data set (data set DS81 as illustrated in FIG. 13). Registration module 870 can then generate (not shown) a digest of data set DS81 stored at network service element 860 and compare that digest with the data set digest included in location record LR83. If the digest and the data set digest are the same (e.g., have the same value) registration module 870 can verify and/or validate that location record LR83 was generated within network service 890.

If location record LR83 is verified and/or validated, registration module 870 can send a command, instruction, or signal along path P134 to network service element 860 to command or request that network service element 860 send data set DS81 to client device 810. Network service element 860 can receive the command, instruction, or signal and send data set DS81 to client device 810 along path P135. In some embodiments, network service element 860 can also generate a location record to account for or memorialize sending data set DS81 to client device 810. For example, in addition to the fields and values of a location record discussed above in relation to FIG. 2, a location record can include a field that includes a value indicating that the data set to which the location record relates was accessed by a client device. The location record can also include a value related to an identity of that client device such as an Internet Protocol ("IP") address, a MAC address, a username, and account name, and/or other identify of that client device. Such fields and/or values can be included in or be separate from the encrypted signature of the location record. The location record can be sent to location registry 880 and subsequently included in a location register for data set DS81 to account for the access to data set DS81.

In some embodiments, an access location record is not included with an access request, and the access request includes an identifier of and/or demonstrates a permission or right to access a requested data set independent from an access location record. For example, an access request can include a name or URI to identify a requested data set and a password or digital certificate to demonstrate a permission or right to access the requested data set.

In some embodiments, a network service can include multiple registration modules and/or a network service can include multiple segments (or sections) each including a registration module, location registry, and multiple network service elements. In such embodiments, registration modules can communicate one with another to, for example, migrate data, generate a location register, provide access to data, and/or to store location records at location registries. For example, a first registration module can communicate via a communications link with a second registration module to determine whether a target network service element registered with the second registration module is trusted within the network service during migration of a data set to the target network service element. As another example, a first registration module can forward a request for access to a data set to a second registration module at which a network service element storing that data set is registered. Similarly, a first registration module can communicate with a second registration module to access location records at multiple location registries to generate a location register for a data set in response to a request for a location register from a client of a network service. Moreover, a first registration module can forward a location record generated at a network service element registered at the first registration module to a second registration module, and the second registration module can send the location record to a location registry. Thus, one segment of a network service can be informed of the movement of a data set within another segment of the network service.

As a more specific example, a first registration module can receive a request from a first network service element for an affirmation that a second network service element is authorized to receive a data set (i.e., that the second network service element is trusted within a network service and the data set is not associated with location permission that prevent or forbid storage of the data set at the second network service element). The first registration module can be registered with the first registration module and the second registration module can be registered with a second registration module. The first registration module can forward the request to the second registration module because the second network service element is not registered with the first registration module. The second registration module can determine that the second network service element is authorized to receive the data set and can affirm to the first network service element directly or indirectly through the first registration module that the second network service element is authorized to receive the data set. After receiving this affirmation, the first network service element can send the data set to the second network service element.

Some embodiments include a processor and a related processor-readable medium having instructions or computer code thereon for performing various processor-implemented operations. Such a processor can be a general-purpose processor or an application-specific process and can be implemented as a hardware module and/or a software module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java™, C++, C, an assembly language, a hardware description language, and/or another suitable programming language. For example, a processor can be a virtual machine hosted at a computer server including a microprocessor and a memory.

In some embodiments, a processor can include multiple processors. For example, a processor can be a microprocessor including multiple processing engines (e.g., computation, algorithmic or thread cores). As another example, a processor can be a computing device including multiple processors with a shared clock, memory bus, input/output bus, and/or other shared resources. Furthermore, a processor can be a distributed processor. For example, a processor can include multiple computing devices, each including a processor, in communication one with another via a communications link such as a computer network.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

While certain embodiments have been shown and described above, various changes in form and details may be made. For example, some features of embodiments that have been described in relation to one embodiment and/or process at a registration module can be useful at a location registry or network service element. More specifically, for example, processes described in relation to a registration module can be implemented at a location registry. In other words, processes, features, and/or properties of various embodiments described in relation to one element of a network service (e.g., a registration module, a location registry, or network service element) can be related (e.g., a process performed or a feature existing at) another element of the network service. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. A method of monitoring data set locations within a network service, comprising:
    receiving from a client device a data set at a network service element at which the data set is to be stored, the element including a hardware storage device to store the data set, the element operatively coupled to a communications link;
    generating at the element a location record based on the data set and a cryptographic key associated with the element in response, the location record uniquely identifying a presence of the data set at the element; and
    sending the location record from the element to a location registry maintained at a different hardware device than the element and to the client device, via the communications link,
    wherein the element is one of a plurality of network service elements that participate in an on-demand data storage service to store data received from a plurality of client devices including the client device, the elements storing the data in a distributed manner in which data is migrated among the elements and in an opaque manner in which the client devices are unaware of and do not control which of the elements store the data,
    wherein the location registry provides a location auditing capability by which the client devices, ascertain when and which of the elements have stored given data, using a plurality of location records including the location record that track the data as the data is stored at and migrated among the elements.

2. The method of claim 1, wherein the location record is a first location record, the method further comprising:
    providing a second location record to the location registry via the communications link in response to a migration of the data set from the network service element.

3. The method of claim 1, wherein the location record includes an encrypted signature of the data set and a trusted device identifier of the network service element, the encrypted signature encrypted based on the cryptographic key, the method further comprising:
    sending, before the receiving the data set, a registration request including location information associated with the network service element to a registration module via the communications link, the trusted device identifier being associated with the network service element in response to the registration request.

4. The method of claim 1, wherein the network service element is a first network service element and the location record is a first location record, the method further comprising:
    sending, before the receiving, a registration request associated with the first network service element to a registration module via the communications link, the first network service element being registered as a trusted device with the registration module in response to the registration request;
    requesting from the registration module affirmation that a second network service element is registered as a trusted device with the registration module;
    sending the data set to the second network service element; and
    providing a second location record to the location registry via the communications link in response to a migration of the data set from the first network service element.

5. A system to monitor data set locations, comprising:
    a first registered network service element including a hardware-based cryptographic module and a storage element;
    a second registered network service element including a hardware-based cryptographic module and a storage element;
    a registration module to affirm that the first registered network service element is registered with the registration module and to affirm that the second registered network service element is registered with the registration module; and
    a location registry to receive from the first registered network service element and then store a first location record associated with storage of a data set at the storage element of the first registered network service element and to receive from the second registered network service element and then store a second location record associated with storage of the data set at the storage element of the second registered network service element, the first location record uniquely associated with the hardware-based cryptographic module of the first network service element, the second location record uniquely associated with the hardware-based cryptographic module of the second network service element, wherein the first location record is generated specifically by the first registered network service element, and the second location record is generated specifically by the second registered network service element, wherein the element is one of a plurality of network service elements that participate in an on-demand data storage service to store data received from a plurality of client devices including the client device, the elements storing the data in a distributed manner in which data is migrated among the elements and in an opaque manner in which the client devices are unaware of and do not control which of the elements store the data, wherein the location registry provides a location auditing capability by which the client devices, ascertain when and which of the elements have stored given data, using a plurality of location records including the location record that track the data as the data is stored at and migrated among the elements.

6. The system of claim 5, wherein:

the first registered network service element is operable to request from the registration module an affirmation that the second registered network service element is registered with the registration module;

the first registered network service element is operable to send the data set to the second registered network service element in response to the affirmation; and the location registry is operable to receive the second location record after the data set is sent from the first registered network service element to the second registered network service element.

7. The system of claim 5, wherein:

the registration module is a first registration module;

the first registration module is operable to determine that a migration of the data set to a third registered network service element is authorized, the third registered network service element registered with a second registration module; and the location registry is operable to receive a third location record associated with storage of the data set at the third registered network service element.

8. The system of claim 5, wherein:

the first location record includes a first encrypted signature of the data set and a trusted device identifier of the first registered network service element, the first encrypted signature encrypted based on a cryptographic key of the hardware-based cryptographic module of the first registered network service element; and the second location record includes a second encrypted signature of the data set and a trusted device identifier of the second registered network service element, the second encrypted signature encrypted based on a cryptographic key of the hardware-based cryptographic module of the second registered network service element.

9. The system of claim 5, wherein:

the registration module is operable to receive an access request for the data set and an access location record from a client device;

the registration module is operable to compare the access location record to the second location record; and the registration module is operable to authorize the client device for access to the data set if the access location record matches the second location record.

10. A method of reporting location information associated with data set storage at network service elements within a network service, comprising:

accessing, by a location registry, a first location record associated with a data set, the first location record uniquely identifying the data set and a first network service element operable to store the data set at a first time, the first location record generated by the first network service element responsive to receiving the data set for storage and then sent to the location registry at which the first location record is stored;

accessing, by the location registry, a second location record associated with the data set, the second location record uniquely identifying the data set and a second network service element operable to store the data set at a second time after the first time, the second location record generated by the second network service responsive to receiving the data set for storage and then sent to the location registry at which the second location record is stored; and generating, by the location registry, a location register including the first location record and the second location record, wherein each of the first network service element, the second network service element, and the location registry is implemented at a different hardware device communicatively coupled to one another over a network, wherein the element is one of a plurality of network service elements that participate in an on-demand data storage service to store data received from a plurality of client devices including the client device, the elements storing the data in a distributed manner in which data is migrated among the elements and in an opaque manner in which the client devices are unaware of and do not control which of the elements store the data, wherein the location registry provides a location auditing capability by which the client devices, ascertain when and which of the elements have stored given data, using a plurality of location records including the location record that track the data as the data is stored at and migrated among the elements.

11. The method of claim 10, further comprising:

receiving a request for a location register associated with the data set from a client device; and sending, after the generating, the location register to the client device.

12. The method of claim 10, further comprising:

receiving the first location record in response to migration of the data set to the first network service element; and receiving the second location record in response to migration of the data set from the first network service element to the second network service element.

13. The method of claim 10, wherein:

the first location record includes a first encrypted signature of the data set and a trusted device identifier of the first network service element, the first encrypted signature encrypted based on a first cryptographic key physically bound to the first network service element; and the second location record includes a second encrypted signature of the data set and a trusted device identifier of the second network service element, the second encrypted signature encrypted based on a second cryptographic key physically bound to the second network service element.

14. The method of claim 10, wherein:

the first network service element is registered at a first registration module;

the second network service element is registered at a second registration module; and the accessing the second location record includes requesting the second location record from the second registration module.

\* \* \* \* \*